Jan. 13, 1925.   1,522,999
S. R. CAMPBELL
FLUID TIGHT JOINT FOR VALVES AND PIPE COUPLINGS
Filed Jan. 13, 1922
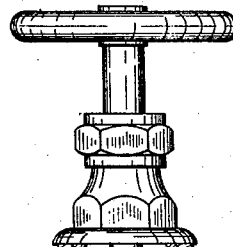
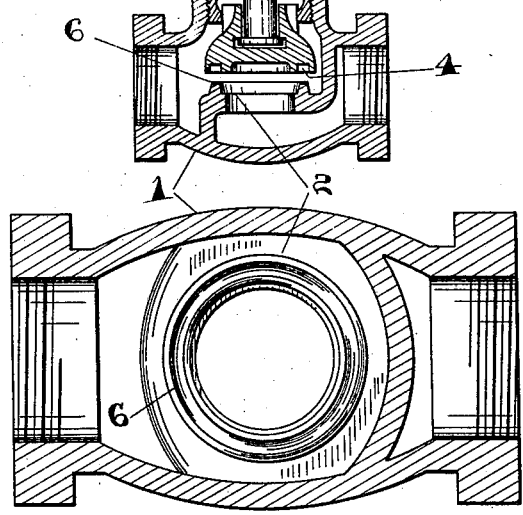
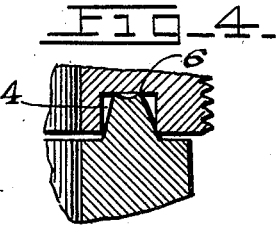
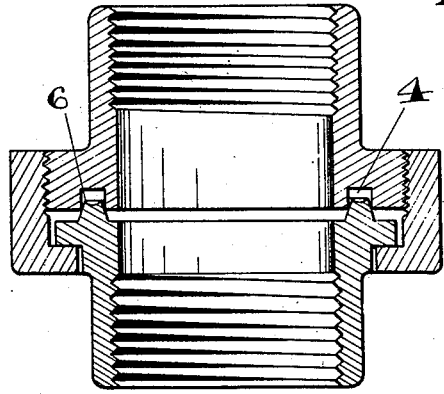
INVENTOR
S. R. Campbell
BY J. Edward Maybee
ATTY.

Patented Jan. 13, 1925.

1,522,999

UNITED STATES PATENT OFFICE.

SEPTIMUS R. CAMPBELL, OF TORONTO, ONTARIO, CANADA.

FLUID-TIGHT JOINT FOR VALVES AND PIPE COUPLINGS.

Application filed January 13, 1922. Serial No. 529,035.

*To all whom it may concern:*

Be it known that I, SEPTIMUS R. CAMPBELL, of the city of Toronto, in the county of York, Province of Ontario, Canada, a subject of the King of Great Britain, have invented certain new and useful Improvements in Fluid-Tight Joints for Valves and Pipe Couplings, of which the following is a specification.

This invention relates to means for producing a water and airtight joint especially applicable to globe and other valves, taps, bibs, and the like and also in the construction of union couplings for pipes, whereby washers, gaskets and the like may be dispensed with and a joint obtained which will withstand great pressures.

I attain my object by means of the constructions hereinafter described and illustrated in the accompanying drawings in which—

Fig. 1 is a longitudinal section of a valve constructed in accordance with my invention;

Fig. 2 a face view of the valve seat; and

Fig. 3 a view similar to Fig. 1 showing a modified form of my invention as applied to a flange union for pipes.

Fig. 4 a detail showing the construction as it would appear after the valve seat and valve have become worn.

In the drawings like numerals of reference indicate corresponding parts in the different figures.

1 is the casing of a globe valve, 2 the valve seat and 3 the valve disk.

In the valve disk is formed an annular groove 4 having its side walls substantially at right angles to the face of the disk. In the valve seat is formed an annular rib having its sides tapered from the outer face towards the base of the rib, the rib therefore being frusto wedge-shaped in cross section.

The groove and rib are so proportioned and located that the groove will partly receive the rib, the latter engaging the sharp edges of the side walls of the groove whereby the two parts of the joint engage only on two lines.

The rib does not, when the joint is new, reach the bottom of the groove, and ample provision for wear is thus made.

The line contact may be lost if the joint is subjected to much wear as would be the case when it is used in a valve seat and I therefore prefer to concave the face of the rib as shown so that, if the parts wear down till the rib reaches the bottom of the groove, the sharp edges 6 will engage the bottom of the groove and re-establish the line contact as shown in Fig. 4.

In Fig. 3 the invention is shown as applied to a well known form of pipe coupling.

It will be found that a joint constructed as set forth will remain tight under all conditions and is particularly adapted for high pressure couplings and valves. It is found that with the contact between the parts occurring along lines any soft particles getting in between are readily cut, while harder particles are readily displaced one way or the other, and the proper engagement of the parts is not in either case interfered with.

What I claim for my invention is:—

A joint for valves and pipes comprising two parts each having an annular flange formed thereon opposed to the flange on the other part, one flange having a groove of rectangular cross section formed therein having sharp edges, and the other flange an annular rib of tapered cross section and of greater depth than the groove, the groove being adapted to partly receive the rib and adapted to engage with its sharp edges the tapered sides of said rib, whereby the two parts of the joint contact only on lines, and the face of the rib being formed with two sharp circular edges separated by a depression, said circular edges being adapted to engage the bottom of the groove when the sides of the rib and groove are sufficiently worn.

Signed at Toronto, this 6th day of January, 1922.

SEPTIMUS R. CAMPBELL.